United States Patent [19]

Kaneko

[11] Patent Number: 4,720,813
[45] Date of Patent: Jan. 19, 1988

[54] PRINTER INFORMATION INQUIRY COMMUNICATION SYSTEM AND PRINTER

[75] Inventor: Masahiko Kaneko, Saitama, Japan

[73] Assignee: Citizen Watch Co., Ltd., Tokyo, Japan

[21] Appl. No.: 695,733

[22] Filed: Jan. 25, 1985

[30] Foreign Application Priority Data

Jan. 26, 1984 [JP] Japan .................................. 59-11011

[51] Int. Cl.⁴ ................................................ G06F 3/12
[52] U.S. Cl. ................................................... 364/900
[58] Field of Search ... 364/200 MS File, 900 MS File

[56] References Cited

U.S. PATENT DOCUMENTS 4,174,536 11/1979 Misunas et al. ................. 364/200
4,367,525 1/1983 Brown et al. ..................... 364/200
4,392,197 7/1983 Couper et al. .................... 364/200
4,446,459 5/1984 Bond, Jr. et al. ................. 364/900

Primary Examiner—Thomas M. Heckler
Attorney, Agent, or Firm—Lowe, Price, Leblanc, Becker & Shur

[57] ABSTRACT

In a communication system and a printer utilizing a conventional interface between a central processing unit in a main device and the printer, the central processing unit asserts a reset signal and sends a printer information inquiry code onto data lines, and then a strobe signal. The printer checks that the reset signal has been asserted and thereafter sends printer information to the central processing unit through status signal lines.

10 Claims, 4 Drawing Figures

PRINTER INFORMATION INQUIRY COMMUNICATION SYSTEM AND PRINTER

BACKGROUND OF THE INVENTION

1. Field of the Invention

The present invention relates to a printer and a printer information inquiry communication system thereof for automatically checking functions or the like of a printer connected to a main central processing unit.

2. Description of the Prior Art

Most conventional printers have different switches such as DIP switches (Dual In-line Package switches for printed circuit board mounting) or functions equivalent to these different switches. By operating the DIP switches, printer functions such as the type and size of characters and line spacing can be selected. More specifically, a user switches the DIP switches for each different application. In different types of printer, code systems differ from each other. Each code system controls the characters and operation of the corresponding printer. A central processing unit in a main device must select control codes or the like in accordance with the type of printer or the internal status. For example, when printers which are and are not capable of paper feed by a carriage return code (CR code) are connected to the main central processing unit, the main central processing unit must select whether to produce an LF code after each CR code. That is, when the CR code is supplied to a printer which does not feed paper in response thereto, an LF code must be sent after the CR code. However, when the CR code is supplied to a printer which feeds paper in response thereto, an LF code need not be sent after the CR code. Conventionally, when a main central processing unit and printers are connected through a parallel interface, these pieces of information cannot be checked by the central processing unit in the main device. This is because unidirectional data signal lines are used to transfer data only from the main central processing unit to the printers. For this reason, in the conventional printer, the operator manually enters these pieces of information into the central processing unit in the main device.

SUMMARY OF THE INVENTION

It is an object of the present invention to solve the drawbacks of a conventional printer and to provide a printer and a printer information inquiry communication system for a printer connected to a central processing unit in a main device through a parallel interface control circuit, wherein different pieces of printer information can be automatically detected by the central processing unit in the main device.

It is another object of the present invention to simultaneously check and detect printer information such as a function set by different switches such as DIP switches in the printer, and the type of printer in response to a printer information inquiry from the central processing unit in the main device.

In order to achieve the above objects of the present invention, there is provided a printer and a printer information inquiry communication system for a printer connected to a central processing unit of a main device through a parallel interface control circuit, wherein the central processing unit in the main device asserts or enables a reset signal to send a printer information inquiry code onto data lines, and thereafter sends a strobe signal; the printer checks that the reset signal has been asserted or enabled when the printer receives the strobe signal; and the printer receives data from the data lines and transmits a printer information code to the central processing unit in the main device through status signal lines. The printer information inquiry codes from the central processing unit in the main device correspond to different types of printer information. Different printer inquiry codes are sequentially sent to detect corresponding types of printer information. However, only one printer inquiry code may be used to obtain all types of printer information.

According to the present invention, by using the data signal lines, the strobe signal line, a reset signal line, the status signal lines, receive signal lines and the like which are connected between the central processing unit in the main device and the conventional interface control circuit, printer information such as the printer type, and the function set by the different switches such as the DIP switches can be inquired. Therefore, an additional device is not required. In addition to this advantage, unlike the conventional system, the operator need not manually enter printer information inquiry codes into the central processing unit in the main device. The printer can be easily controlled, thus simplifying the operation of the printer.

DETAILED DESCRIPTION OF THE PREFERRED EMBODIMENT

A preferred embodiment of the present invention will be described in detail hereinafter.

Figure 1:
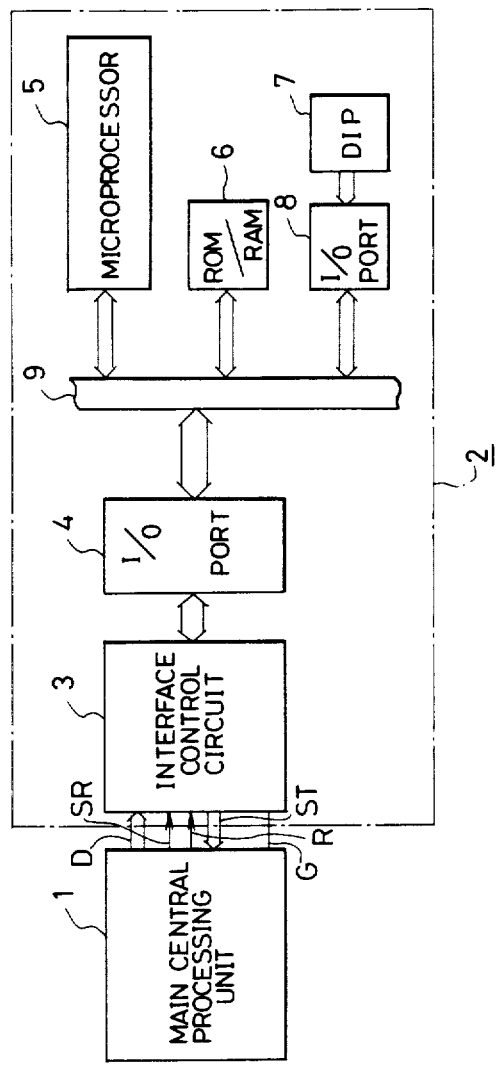
FIG. 1 is a block diagram showing the internal configuration of a printer and connections between a central processing unit in a main device and an interface control circuit in the printer according to the present invention.

FIG. 1 is a block diagram showing the connections between a central processing unit in a main device and a printer. Reference numeral 1 denotes a main central processing unit; and 2, a printer. The printer 2 comprises a microprocessor 5 for controlling the overall operation of the printer 2, a memory 6 such as a ROM for storing a control program and a RAM for storing processing/processed data, and DIP switches 7. The microprocessor 5, the memory 6 and the DIP switches 7 are connected to the main central processing unit 1 through an interface control circuit 3 and an I/O port 4. The interface between the main central processing unit 1 and the printer 2 generally comprises a plurality (e.g., 8) of data lines D, one strobe signal line SR, one reset signal line R, a plurality (e.g., 3) of status signal lines ST, a ground line G and the like. It should be noted that reference numeral 9 denotes an internal bus of the printer and that reference numeral 8 denotes an input/output port for connecting the DIP switches 7 to the internal bus 9.

The main central processing unit 1 generates a character code and a printer control code to be supplied through the data lines D, and a strobe signal through the strobe signal line SR to cause the printer 2 to start printing and control. The printer 2 sends a status signal representing current status information, such as a ready status and an on-line status onto the status signal lines ST. The printer status is thus signalled to the main central processing unit 1. The main central processing unit 1 generates a reset signal through the reset signal line R to initialize the printer 2.

Conventionally, in the parallel interface between the main central processing unit 1 and the printer 2, only the above-mentioned communication is performed through the data lines D, the strobe line SR, the reset line R and the status signal lines ST. However, according to the present invention, by using these signal lines, printer information such as the type of the printer 2 connected to the main central processing unit 1 and the function set by the DIP switches can be inquired by the main central processing unit. Inquiry codes representing the contents of the inquiries from the main central processing unit 1 to the printer 2 are determined. More particularly, a code for inquiring a model group of the printers is defined as 01H; a code for inquiring a model number is defined as 02H; a code for inquiring a type of printer is defined as 03H; and codes for inquiring functions of the printer which are set by the DIP switches 7 are defined as 04H to N. These codes are common to the main central processing unit 1 and the printer 2. The memory 6 in the printer 2 stores codes representing the model group of the printer, the model number, and the type of printer. At the same time, the memory 6 stores a code corresponding to each of the printer functions which is set by the DIP switches 7 through the input-/output port 8. In this embodiment, the respective functions set by the DIP switches 7 are stored in the memory 6. However, these function data need not be stored in the memory 6. In this case, every time an inquiry code is entered from the main central processing unit 1, the microprocessor 5 fetches the state of the DIP switches 7 through the input/output port 8 and transmits preset function data to the main central processing unit 1.

Figure 2:
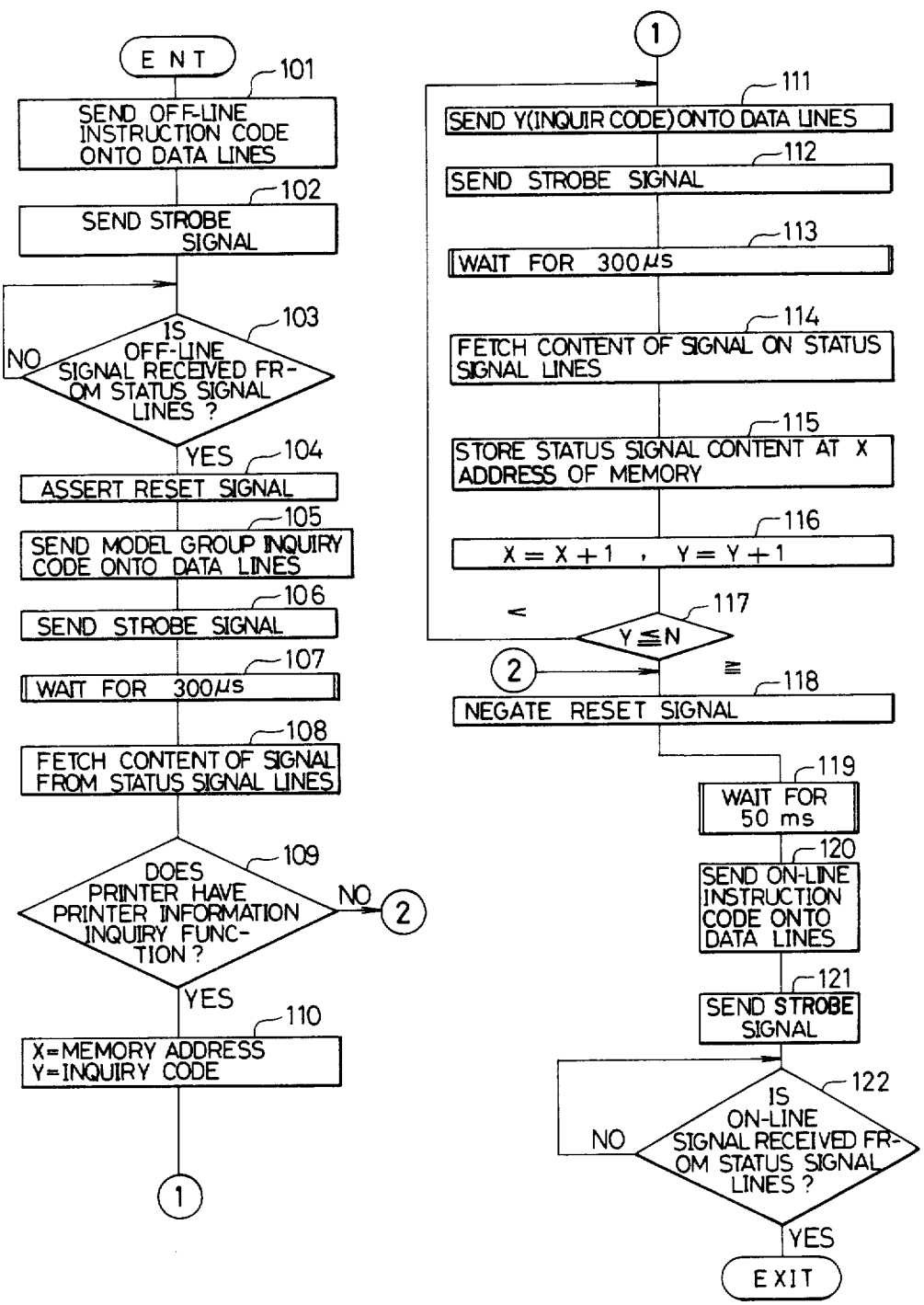
FIG. 2 is a flow chart for explaining printer information inquiry processing in the central processing unit in the main device.
Figure 3B:
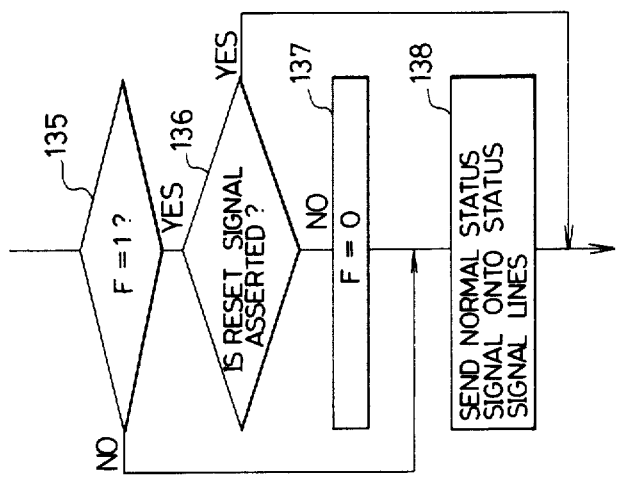
FIGS. 3A and 3B are respectively flow charts illustrating printer information inquiry processing at the printer side.
Figure 3A:
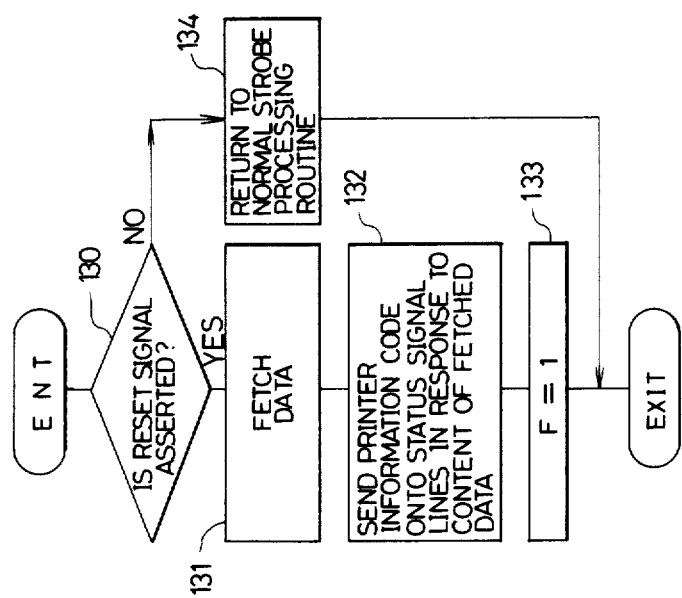

The operation of the printer information inquiry communication system will be described with reference to the flow charts of FIGS. 2, 3A and 3B. FIG. 2 shows the flow of the operation of the main central processing unit 1, and FIGS. 3A and 3B show the flows of the operation of the printer 2.

When desired information of the printer 2 connected to the main central processing unit 1 is inquired therefrom, the main central processing unit 1 supplies an off-line instruction code onto the data lines D so as to set the printer 2 in the off-line status. Subsequently, the main central processing unit 1 sends the strobe signal onto the strobe signal line SR (steps 101 and 102). The printer 2 starts off-line processing, and the main central processing unit 1 waits until the off-line signal is received through the status signal lines ST (step 103). When the main central processing unit 1 receives the off-line signal, it asserts, i.e., applies a "true" logic signal on, the reset signal line R (step 104). The main central processing unit 1 sends the model group inquiry code (i.e., 01H) onto the data lines D and subsequently the strobe signal (steps 105 and 106). The printer 2 starts inquiry processing, and the main central processing unit 1 waits for about 300 μs and thereafter receives a model group code of the printer 2 through the status signal lines ST (step 108). The main central processing unit 1 checks in step 109 whether or not the printer 2 is a printer having a printer information inquiry function. If NO in step 109, the flow advances to step 118 and subsequent steps so as to perform inquiry end operation. However, if YES in step 109, let an index X be an empty address of the memory of the main central processing unit 1, and let an index Y be a minimum code of the inquiry codes (i.e., 01H, 02H, . . . and N) (step 110). The main central processing unit 1 sends the value (i.e., the inquiry code) of the index Y onto the data lines D and the strobe signal (steps 111 and 112) so as to cause the printer 2 to perform inquiry processing. The main central processing unit 1 waits for about 300 μs (step 113) and fetches a content of the response to the inquiry code through the status signal lines ST (step 114). When the inquiry code coincides with the model number inquiry code, the code representing the model number of the printer is fetched by the main central processing unit 1. When the inquiry code coincides with the type of printer, the code representing the type of printer is fetched by the main central processing unit 1. When the inquiry code coincides with the function set by the DIP switches 7, the code representing the function selected by the DIP switches 7 is fetched by the main central processing unit 1. The content (i.e., the printer information) of the status signal lines is stored at the address of the memory (of the main central processing unit 1) which is designated by the index X (step 115). The indices X and Y are respectively incremented by one (step 116). The main central processing unit 1 checks in step 117 whether or not the index Y is equal to or smaller than the maximum inquiry code N. In other words, the main central processing unit 1 checks whether or not all pieces of printer information have been inquired. If the main central processing unit 1 determines that the index Y is smaller than the maximum inquiry code N, the flow returns to step 111. In other words, a code larger by one than the immediately preceding code is sent by the main central processing unit 1, and the response from the printer 2 is stored in a memory location at an address higher by one than the immediately preceding address. When the main central processing unit 1 determines in step 117 that the index Y is equal to or larger than the maximum inquiry code N, the main central processing unit 1 negates or disables the reset signal line R (step 118). The main central processing unit 1 then waits for about 50 ms (step 119) and sends an on-line instruction code onto the data lines D and the strobe signal (steps 120 and 121), thereby resetting the printer 2 to on-line status. The main central processing unit 1 then waits until it receives a signal representing the on-line status through the status signal lines (step 122). When the signal representing the on-line status is received by the main central processing unit 1, the normal operation is restored.

The above description is concerned with the operation of the main central processing unit 1. In the above flow chart, when all the printers connected to the main central processing unit 1 are printers having a printer information inquiry function, the operation between steps 105 and 109 can be omitted.

The operation of the printer 2 will be described with reference to FIGS. 3A and 3B.

When the printer 2 receives the strobe signal from the main central processing unit 1, interrupt processing shown in FIG. 3A is started. The microprocessor 5 in the printer 2 checks in step 130 whether or not the reset signal has been asserted. If NO in step 130, a normal (a character or printer control code) strobe processing routine is performed (step 134). However, if YES in step 130, the microprocessor 5 fetches data (i.e., the inquiry code) from the data lines D (step 131). In response to the content of the fetched inquiry code, corresponding data (i.e., the model group code of the printers, the model number code, the printer type code, and the code corresponding to the function set by the DIP switches) is read out from the memory 6 and is sent onto the status signal lines ST (step 132). Subsequently, the microprocessor 5 sets an inquiry mode flag F to logic "1", thereby ending interrupt processing. Every time the strobe signal is received by the printer 2, the operation in steps 130 to 134 is repeated, and the data responding to the inquiry code from the main central processing unit 1 is returned thereto. The function information is thus stored in the memory of the main central processing unit 1. A subroutine shown in FIG. 3B is provided in the main routine of the program of the printer 2. The operation in steps 135 to 138 is normally performed. More particularly, the microprocessor 5 checks in step 135 whether or not the inquiry mode flag F is set at logic "1". If NO in step 135, a normal status signal, i.e., an alarm signal, an on-line signal, a paper end signal or the like is sent onto the status signal lines ST (step 138). However, if YES in step 135, the microprocessor 5 then checks in step 136 whether or not the reset signal line on the reset signal line R is asserted. If YES in step 136, the printer information inquiry mode is set (see steps 104 and 118 of FIG. 2), so that the current status is maintained unchanged. However, if NO in step 136, i.e., when the main central processing unit 1 negates the reset signal in step 118 of FIG. 2, the printer information inquiry is ended. In this case, the inquiry mode flag F is set to logic "0" (step 137), and a normal status signal is sent onto the status signal lines.

It should be noted that the inquiry mode flag F is cleared to logic "0" in the initialization routine.

The present invention is not limited to the particular embodiment described above. In the above embodiment, inquiry codes are provided for respective printer functions. The main central processing unit sequentially generates the inquiry codes, and the printer sends back the corresponding printer information to the main central processing unit. However, only one inquiry code may be generated from the main central processing unit, and the printer may subsequently send back all the printer information to the main central processing unit. In this case, when one printer information inquiry code is sent to the printer, the printer sents back information such as functions of the printer and the display code through the status signal lines and approval signal lines arranged in the conventional interface. When the main central processing unit receives the signals from the printer, it generates the strobe signal. When the strobe signal is received by the printer, the code representing the next printer information is sent, thereby causing the printer to send back all printer information to the main central processing unit.

In the above embodiment, communication between the main central processing unit and the printer is performed after the printer is set in the off-line status. This is because an error occurs when the reset signal is asserted in the on-line status. Even in the on-line status, the reset signal may be asserted to perform the operation after step 104 of FIG. 2.

What is claimed is:

1. In a computer controlled printer system having status, reset, strobe and data lines, and wherein a printer and a central processing unit of a main device are coupled to each other through a parallel interface control circuit and said printer is controlled by said central processing unit to print information on a receiving medium, a printer information inquiry communication system for transmitting information identifying a characteristic of said printer to said central processing unit, comprising:

means in said main device for asserting a reset signal on said reset line to send a printer information inquiry code onto said data lines and thereafter to send a strobe signal on said strobe line to said printer; and means responsive to said strobe and reset signals by said printer for receiving said printer information inquiry code on said data lines and in response transmitting a printer information code on said status signal lines to said central processing unit.

2. A communication system according to claim 1, wherein said printer information code includes a code inquiring of a type of printer, and the printer information inquiry code corresponds to each of a plurality of different printer information codes.

3. A communication system according to claim 2, wherein said central processing unit includes means for transmitting sequential printer information inquiry codes separated by time intervals sufficient to allow said printer to respond to each of the printer information inquiry codes, and memory means for storing corresponding printer information codes.

4. A communication system according to claim 2, wherein said central processing unit includes means for transmitting an off-line instruction code to said printer, means for checking that the printer is an off-line status and means responsive to said off-line status of said printer for transmitting said printer information inquiry code to said printer.

5. A communication system according to claim 1, wherein said printer information inquiry code comprises a single code; and said printer includes means responsive to said code for transmitting one of a number of remaining different information codes to said central processing units.

6. In a computer controlled printer system having status, reset, strobe and data lines, and wherein a printer and a central processing unit of a main device are coupled to each other through a parallel interface, and said printer is controlled by said central processing unit to print information on a receiving medium, a printer information inquiry communication system for transmitting information identifying a characteristic of said printer to said central processing unit, comprising:

means in said central processor unit for asserting said reset line and then transmitting a strobe signal to said printer on said strobe line; and memory means for storing a printer information code of said printer;

said printer including detecting means for detecting that said reset line asserted when said strobe signal is received by said printer;

said printer further including means for reading data on said data lines, means for reading the printer information code from said memory means and means responsive to said detecting means for transmitting the read printer information code to said central processing unit.

7. A communication system according to claim 6, wherein the printer information code includes codes representing a type of said printer and functions set by switches in said printer.

8. A communication system according th claim 6, wherein said printer further includes means for transmitting said printer information code on said status lines to said central processing unit.

9. A computer controlled printer with a printer information inquiry communication function, said printer having status, reset, strobe and data lines, and coupled to a central processing unit of a main device through a parallel interface, and adapted to be controlled by said central processing unit to print information on a receiving medium, comprising:

memory means for storing a printer information code of said printer, said printer information code including printer model data and/or preset function data of said printer and enabling said central processing unit to identify said printer;

detecting means for detecting that said reset line is asserted when said strobe signal is received by said printer;

means responsive to said detecting means for reading an inquiry code on said data lines;

means for reading the printer information code from said memory means in response to the thus read inquiry code; and means for transmitting the read printer information code to said central processing unit through said status line.

10. In a computer controlled printer system having status, reset, strobe and data lines, and wherein a printer and a central processing unit of a main device are coupled to each other through a parallel interface control circuit and said printer in controlled by said central processing unit to print information on a receiving medium, a method of printer information inquiry communication for transmitting to said central processing unit information identifying a characteristic of said printer, said method comprising the steps of:

controlling said central processing unit to assert a reset signal on said reset line to send a printer information inquiry code onto said data lines and thereafter to send a strobe signal on said strobe line to said printer; and in response to said strobe and reset signals received by said printer, controlling said printer to receive said printer information inquiry code on said data lines and to thereafter transmit a printer information code on said status signal lines to said central processing unit.

* * * * *